US012779716B2

(12) United States Patent
Han et al.

(10) Patent No.: US 12,779,716 B2
(45) Date of Patent: Nov. 3, 2026

(54) RAZOR CARTRIDGE

(71) Applicant: DORCO CO., LTD., Yongin-si (KR)

(72) Inventors: Da Woon Han, Seoul (KR); Sang Ho Han, Seoul (KR)

(73) Assignee: Dorco Co., LTD., Seoul (KR)

( * ) Notice: Subject to any disclaimer, the term of this patent is extended or adjusted under 35 U.S.C. 154(b) by 95 days.

(21) Appl. No.: 18/962,222

(22) Filed: Nov. 27, 2024

(65) Prior Publication Data

US 2025/0170737 A1 May 29, 2025

(30) Foreign Application Priority Data

Nov. 29, 2023 (KR) ........................ 10-2023-0168895

(51) Int. Cl.
*B26B 21/22* (2006.01)
*B26B 21/40* (2006.01)
*B26B 21/44* (2006.01)

(52) U.S. Cl.
CPC ........ *B26B 21/227* (2013.01); *B26B 21/4018* (2013.01); *B26B 21/443* (2013.01)

(58) Field of Classification Search
CPC .. B26B 21/227; B26B 21/4018; B26B 21/443
See application file for complete search history.

(56) References Cited

U.S. PATENT DOCUMENTS 6,615,498 B1 9/2003 King et al.
11,685,070 B2 * 6/2023 Brette ................ B26B 21/4012 30/526
2006/0288595 A1 12/2006 Takeshita
2010/0205808 A1 * 8/2010 King .................... B26B 21/225 30/34.2
2014/0245613 A1 9/2014 Good et al.
2019/0337174 A1 11/2019 Kopelas et al.
2020/0180178 A1 * 6/2020 Park ..................... B26B 21/521
2021/0008744 A1 * 1/2021 Chang ................... B26B 21/225
2021/0162614 A1 * 6/2021 Coresh ................ B26B 21/4012
(Continued)

FOREIGN PATENT DOCUMENTS

EP 4563306 A1 * 6/2025 ........... B26B 21/225
JP 2001-259262 A 9/2001
(Continued)

OTHER PUBLICATIONS

Extended European Search Report (EESR) received in European Application No. 24216522.3 dated Mar. 13, 2025.
(Continued)

*Primary Examiner* — Omar Flores Sanchez
(74) *Attorney, Agent, or Firm* — Knobbe, Martens, Olson & Bear, LLP

(57) ABSTRACT

According to one embodiment of the present disclosure, there is provided a razor cartridge comprising: a blade housing for accommodating at least one razor blade having a cutting edge in a longitudinal direction, the blade housing including a housing top surface toward which the cutting edge faces and a housing bottom surface opposite to the housing top surface; and a frame coupled with the blade housing, the frame being coupled with the blade housing such that the blade housing is pivotable with respect to the frame about a first pivot axis penetrating the blade housing.

19 Claims, 17 Drawing Sheets

(56) References Cited

U.S. PATENT DOCUMENTS

| | | | | |
|---|---|---|---|---|
| 2021/0245380 | A1 | 8/2021 | Petratou et al. | |
| 2025/0042051 | A1* | 2/2025 | Razzaghi | B26B 21/227 |
| 2025/0170738 | A1* | 5/2025 | Han | B26B 21/227 |

FOREIGN PATENT DOCUMENTS

| | | | |
|---|---|---|---|
| KR | 10-2019-0103216 | A | 9/2019 |
| KR | 10-2019-0103218 | A | 9/2019 |
| KR | 10-2021-0007199 | A | 1/2021 |
| WO | WO 2018/134103 | A1 | 7/2018 |

OTHER PUBLICATIONS

Office Action dated Jan. 12, 2026, in Korean Patent Application No. 10-2024-0171762 in 9 pages.

Decision to Grant received in corresponding KR 10-2024-0171762 dated Jul. 1, 2026.

* cited by examiner

RAZOR CARTRIDGE

TECHNICAL FIELD

The present disclosure relates to a razor cartridge.

BACKGROUND ART

The contents described in this section simply provide background information on the present disclosure and do not constitute prior art.

A conventional razor, generally known as a wet razor, includes a razor cartridge and a razor handle.

The razor cartridge may be configured to pivot about a rotational axis (hereinafter, "parallel axis") parallel to an alignment direction of a razor blade between a rest position and a pivot position in an assembled state. The pivoting about the parallel axis helps to achieve efficient shaving by smoothly contacting the razor cartridge with a user's skin.

In addition, recently, in order to smoothly contact the user's skin, a razor having a pivot function about a rotational axis (hereinafter, "vertical axis") perpendicular to the parallel axis in addition to the pivot function about the parallel axis has been developed.

Meanwhile, since most of the vertical axis passes through the razor handle, a distance between the vertical axis and the razor cartridge is far. Therefore, the pivoting about the vertical axis may be somewhat less responsive to a user's stroke. In this case, skin adhesion may be weakened, and excessive stimulation may be applied to the user's skin.

Meanwhile, the razor cartridge includes a lubricating band for applying a lubricant. The lubricant included in the lubricating band may be applied to the user's skin before or after shaving to make the cartridge stroke smoother or reduce irritation to the skin during shaving.

Generally, the lubricating band is placed at the rear of the razor blade in the shaving direction. In this case, the lubricating band may have a limited area, and it is difficult to apply lubricants with various characteristics. Therefore, in order to make the stroke smoother and reduce skin irritation during shaving, the development of a razor cartridge that can apply more lubricants and lubricants with various characteristics may be required.

DISCLOSURE

Technical Problem

Accordingly, the present disclosure is intended to solve these problems, and provides a razor cartridge that is capable of pivoting within the razor cartridge so that the pivoting is highly responsive and the contact with a user's skin is improved, and applying various lubricants over a wider range.

Technical Solution

According to one embodiment of the present disclosure, the present disclosure provides a razor cartridge comprising: a blade housing for accommodating at least one razor blade having a cutting edge in a longitudinal direction, the blade housing including a housing top surface toward which the cutting edge faces and a housing bottom surface opposite to the housing top surface; and a frame coupled with the blade housing, the frame being coupled with the blade housing such that the blade housing is pivotable with respect to the frame about a first pivot axis penetrating the blade housing.

Advantageous Effects

As described above, according to the present embodiment, there is an effect of enhancing responsiveness of the pivoting, improving the contact with a user's skin, and applying various lubricants over a wider range.

MODE FOR DISCLOSURE

Figure 1A:
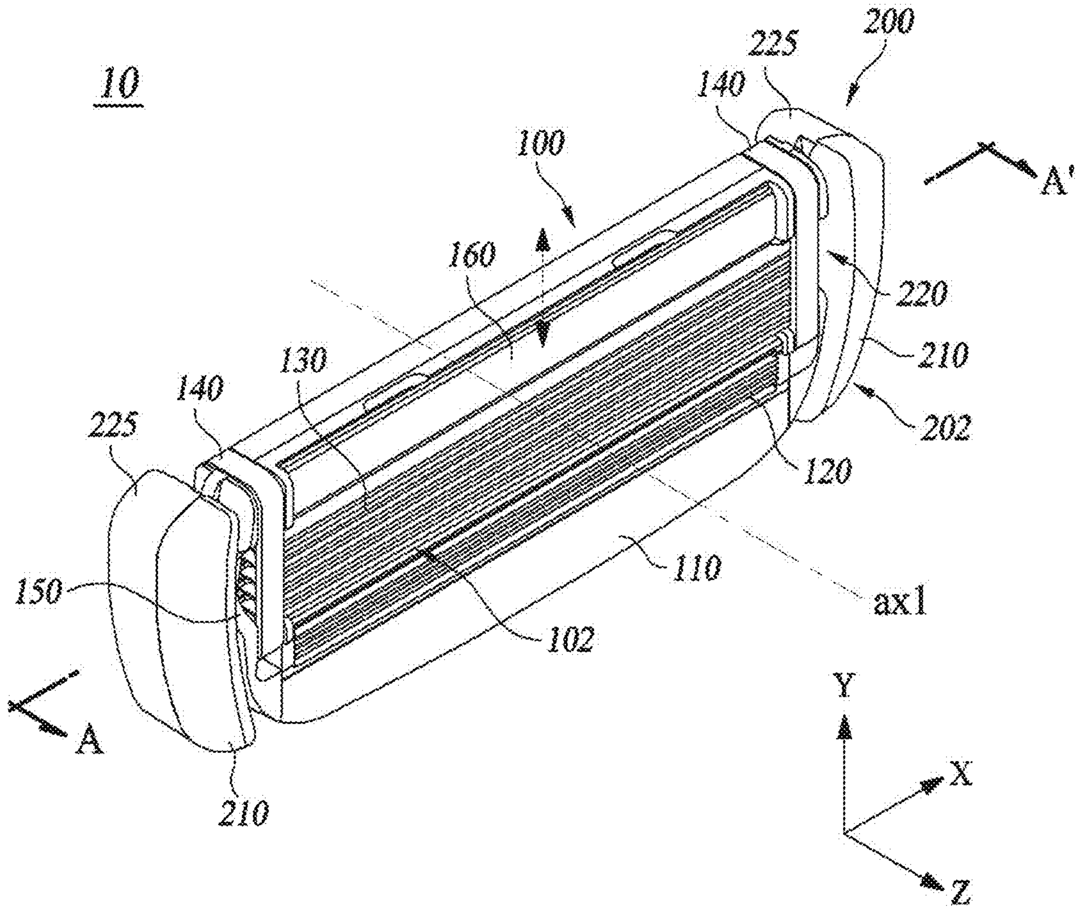
FIG. 1A is a combined perspective view of a razor cartridge according to one embodiment of the present disclosure.

Hereinafter, some embodiments of the present disclosure will be described in detail with reference to the accompanying drawings. It is to be noted that in giving reference numerals to components of each of the accompanying drawings, the same components will be denoted by the same reference numerals even though they are illustrated in different drawings. Further, in describing exemplary embodiments of the present invention, well-known functions or constructions will not be described in detail since they may unnecessarily obscure the understanding of the present invention.

Terms 'first', 'second', i), ii), a), b), and the like, will be used in describing components according to embodiments of the present disclosure. These terms are only for distinguishing the components from other components, and the nature, sequence, order, or the like of the components are not limited by the terms. Throughout the present specification, unless explicitly described to the contrary, "including" or "comprising" any components will be understood to imply the inclusion of other elements rather than the exclusion of any other elements.

FIG. 1A is a combined perspective view of a razor cartridge 10 according to one embodiment of the present disclosure.

Figure 1B:
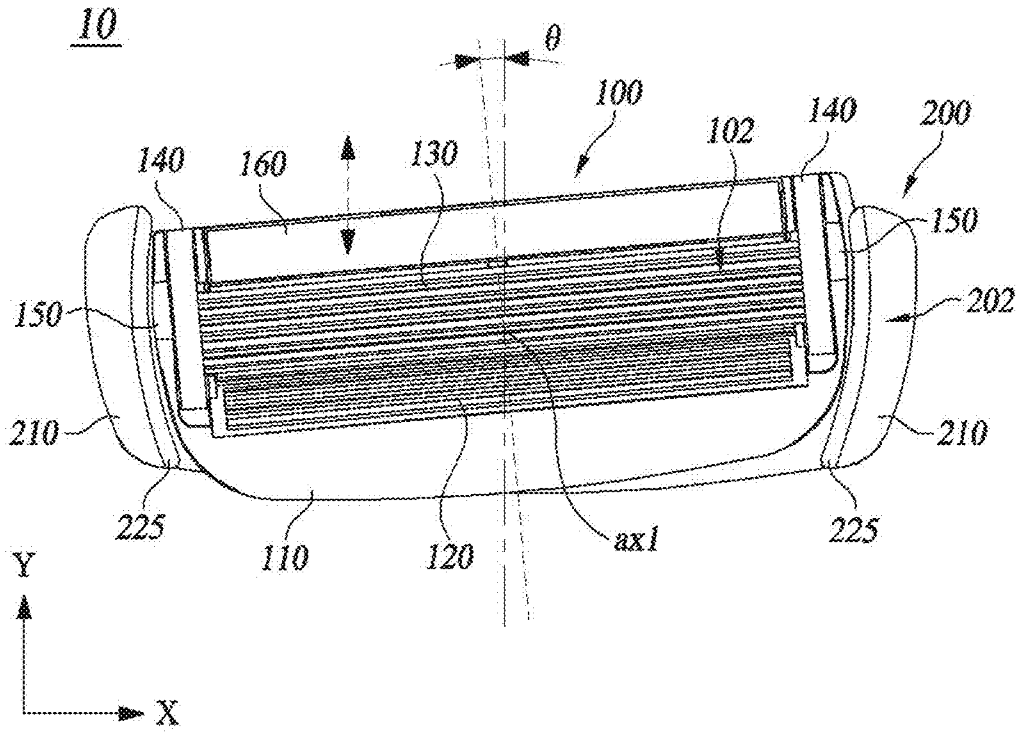
FIG. 1B is a view when an example of a razor cartridge according to one embodiment of the present disclosure pivoting about a first pivot axis is viewed from above.

FIG. 1B a view illustrating an example in which the razor cartridge 10 according to one embodiment of the present disclosure pivots about a first pivot axis.

Referring to FIGS. 1A and 1B, the razor cartridge 10 according to one embodiment of the present disclosure may include a blade housing 100 and a frame 200.

The blade housing 100 accommodates at least one razor blade 130 having a cutting edge in a longitudinal direction. Here, the longitudinal direction refers to a longitudinal direction of the razor cartridge 10. For example, the longitudinal direction is a direction parallel to an X-axis in FIG. 1A.

The blade housing 100 may include a housing top surface 102 toward which the cutting edge faces and a housing bottom surface 104 (refer to FIG. 3) opposite to the housing top surface 102.

The frame 200 is coupled with the blade housing 100. For example, the blade housing 100 and the frame 200 may be coupled with each other in a height direction. Here, the height direction is a direction parallel to the direction from the housing top surface 102 toward the housing bottom surface 104, for example, a direction parallel to a Z axis in FIG. 1A.

However, the coupling direction of the blade housing 100 and the frame 200 is not necessarily limited to the height direction. For example, the blade housing 100 may be coupled with the frame 200 in the shaving direction or in the direction opposite to the shaving direction. Here, the shaving direction may refer to a direction parallel to a Y-axis direction in FIGS. 1A and 1B.

The frame 200 may be coupled with the blade housing 100 so that the blade housing 100 can pivot with respect to the frame 200 about a first pivot axis ax1. Here, the first pivot axis ax1 may penetrate the blade housing 100 and may be parallel to the height direction.

Referring to FIG. 1B, when a pivot angle θ of the blade housing 100 at the first rest position is 0°, the pivot angle θ may be 1° to 20°, and preferably may be between 10° to 15°. The range of the pivot angle exemplified in FIG. 1B may also be applied to the embodiments of the present disclosure described below.

In the razor cartridge 10 according to one embodiment of the present disclosure, the blade housing 100 within the razor cartridge 10 can pivot about the first pivot axis ax1 penetrating the blade housing 100. For example, even when the razor cartridge 10 is not connected to a razor handle (not shown) or is not connected to a connector (not shown) coupled with one side of the razor handle, the pivoting about the first pivot axis ax1 within the razor cartridge 10 may be possible.

In the razor cartridge 10 according to one embodiment of the present disclosure, by positioning the first pivot axis ax1 within the razor cartridge 10, the pivoting according to a user's stroke may be immediately performed within the razor cartridge 10. Through this, the contact with the user's skin can be improved, and since a rapid change of direction according to the skin condition during shaving is possible, irritation applied to the skin can be reduced.

Meanwhile, the razor cartridge 10 according to one embodiment of the present disclosure may further include a first restoring force providing units 300, 500, 700, 900, 1100 and 1300. The first restoring force providing units 300, 500, 700, 900, 1100 and 1300 are configured to provide a restoring force to the blade housing 100 to return the blade housing 100 to the first rest position in a state where the blade housing 100 is pivoted about the first pivot axis ax1 from the first rest position. Detailed descriptions of how the first restoring force providing units 300, 500, 700, 900, 1100 and 1300 provide the restoring force will be described later.

The first pivot axis ax1 may penetrate the blade housing 100 in a direction parallel to the height direction. However, the direction of the first pivot axis ax1 is not limited thereto, and the first pivot axis ax1 may not be parallel to the height direction.

In order to provide a more stable pivoting, the first pivot axis ax1 may be configured to penetrate the central region of the blade housing 100 in the longitudinal direction. For example, as illustrated in FIG. 1A, the first pivot axis ax1 may be configured to penetrate the region where at least one razor blade 130 is positioned and the central region of the blade housing 100 in the longitudinal direction, but is not necessarily limited thereto.

Meanwhile, the blade housing 100 may be configured to be translated in a direction parallel to the shaving direction with respect to the frame 200, for example, in a direction parallel to the Y-axis direction of FIG. 1A and FIG. 1B. In this case, the first pivot axis ax1 may move in a direction parallel to the Y-axis according to the translation of the blade housing 100.

A movement distance of the blade housing 100 in the direction parallel to the shaving direction from the first rest position may be within 10 mm, preferably within 6 mm, and more preferably within 3 mm.

In addition, in order to provide a restoring force to the blade housing 100 in a state where the blade housing 100 is translated parallel to the shaving direction, the razor cartridge 10 may further include an elastic member such as rubber, a spring, or a plastic tension bar.

Through the translation of the blade housing 100 in a direction parallel to the shaving direction, the buffering action of the razor cartridge 10 can be enabled, and accordingly, a smooth shaving sensation can be provided.

The blade housing 100 includes all or some of a guard 120, a first lubricating band 160, a pair of clips 140, a second lubricating band 110, and a pair of side openings 150.

The guard 120 may be positioned in front of at least one razor blade 130 in the shaving direction. The guard 120 may stretch the skin before the body hair is cut by the at least one razor blade 130 during the shaving process. Accordingly, the user's body hair may be raised in a direction perpendicular to the user's skin surface by the guard 120, thereby making it easier to cut the body hair by the at least one razor blade 130.

Here, the first pivot axis ax1 may be positioned in the rear of the guard 120 in the shaving direction. Since the guard 120 is a point that supports the user's skin during shaving, a force is applied to the point, and when the first pivot axis ax1 is disposed at the rear of the guard 120, the action moment may increase. When the action moment increases, the responsiveness of the pivoting about the first pivot axis ax1 may be further improved.

The force required for the pivoting about the first pivot axis ax1 may be 10 gf to 70 gf, and preferably 30 gf to 50 gf.

The first lubricating band 160 is disposed at the rear of at least one razor blade 130 in the shaving direction. The first lubricating band 160 may be configured to apply a lubricant to the user's skin in order to provide softness to the user.

A pair of clips 140 may maintain at least one razor blade 130 on the blade housing 100. Thereby, at least one razor blade 130 may not be separated from the blade housing 100.

In FIGS. 1A and 1B, one side of each of the pair of clips 140 is configured to penetrate the blade housing 100 and the other side is configured to surround a rear surface of the blade housing 100, but it is not necessarily limited to this configuration as long as the razor blade 130 can be maintained by the blade housing 100.

The second lubricating band 110 may be disposed in front of the guard 120 in the shaving direction. The second lubricating band 110 may be configured to apply a lubricant to the user's skin in order to provide a smooth cartridge stroke to the user. However, it is also possible for the second lubricating band 110 to be disposed between the rear of the guard 120 and at least one razor blade 130.

Here, the lubricant included in the first lubricating band 160 and the lubricant included in the second lubricating band 110 may be the same as each other, but is not necessarily limited thereto, and may be different from each other.

For example, the second lubricating band 110 may come into contact with the user's skin before the user's body hair is raised and/or cut, and thus, may include a component of a shaving aid, and the first lubricating band 160 may come into contact with the user's skin after the user's body hair is raised and cut, and thus, may include a component for relieving skin irritation of the user.

A pair of side openings 150 are formed on both sides of the blade housing 100 in the longitudinal direction so that cleaning water can pass through the blade housing 100 in a region adjacent to both side surfaces of at least one razor blade 130 in the longitudinal direction.

For example, the cleaning water flowing in from the side opening 150 on one side of the blade housing 100 in the longitudinal direction may pass through the side opening 150 on the other side of the longitudinal direction through at least one razor blade 130.

In particular, when the pivoting is performed as illustrated in FIG. 1B, at least a portion of one of the pair of side openings 150 may be exposed to the outside, thereby effectively discharging shaving residues existing in the razor cartridge 10 after shaving.

Meanwhile, the frame 200 includes both or one of at least one outer portion 220 and at least one third lubricating band 210.

At least one outer portion 220 has a height extending in the direction parallel to the first pivot axis ax1 and is configured to surround at least a portion of the outer portion of the blade housing 100 in a state where the blade housing 100 and the frame 200 are coupled with each other.

As illustrated in FIG. 1A and FIG. 1B, at least one outer portion 220 may include a pair of longitudinal side portions 225 spaced apart from each other in the longitudinal direction so as to surround at least a portion of both sides of the blade housing 100 in the longitudinal direction, but is not necessarily limited thereto, and this will be described later.

It is preferable that at least one outer portion 220 is formed to correspond to the outer shape of the blade housing 100, thereby guiding the pivoting of the blade housing 100 and protecting the blade housing 100 from external impact.

At least one third lubricating band 210 is formed on the top surface of at least one outer portion 220 in the height direction. At least one third lubricating band 210 may be configured to apply the lubricant to the user's skin in order to provide softness to the user.

Here, the lubricant included in the third lubricating band 210 may be the same as the lubricant included in the first lubricating band 160 and/or the second lubricating band 110, but is not necessarily limited thereto, and may be different from each other.

In addition, when at least one outer portion 220 includes a pair of longitudinal side portions 225, the frame 200 may include the pair of third lubricating bands 210 formed on the top surface of each of the pair of longitudinal portions 225. In this case, the lubricants included the pair of third lubricating bands 210 may be the same as each other, but is not necessarily limited thereto, and may be different from each other.

For example, assuming that the stroke direction is constant during the shaving, the lubricant included in the third lubricating band 210 on one side of the longitudinal direction may include a component of a shaving aid, and the lubricant included in the third lubricating band 210 on the other side of the longitudinal direction may include a component for relieving skin irritation of the user.

However, the third lubricating band 210 does not necessarily have to be formed as a pair, and may be formed in only one of the pair of the longitudinal side portions 225, or may be formed to be divided in a plurality of region in each longitudinal side portion.

Meanwhile, at least a portion of the housing top surface 102 and at least a portion of the frame 200 adjacent to the housing top surface 102 may form a skin contact surface that comes into contact with the user's skin during shaving.

For example, the frame 200 may include a frame top surface 202 adjacent to the housing top surface 102 and a frame bottom surface 204 (refer to FIG. 4) opposite to the frame top surface 202, and at least a portion of the housing top surface 102 and at least a portion of the frame top surface 202 may form the skin contact surface.

By forming the skin contact surface not only on the blade housing 100 but also on the frame 200, the area in contact with the user's skin within the razor cartridge 10 can be increased, and thus, it is possible to provide a more improved sense of comfort to the user.

In addition, the first to third lubricating bands 160, 110, and 210 may be disposed on the skin contact surface, thereby allowing the application of the lubricant contained in each of the first to third lubricating bands 160, 110, and 210 to be performed in a wider range and in a variety of ways.

Figure 2A:
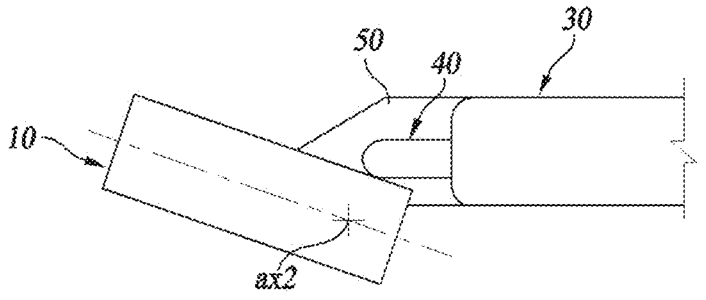
FIGS. 2A to 2C are schematic diagrams illustrating an example of a razor cartridge according to one embodiment of the present disclosure pivoting about a second pivot axis.
Figure 2B:
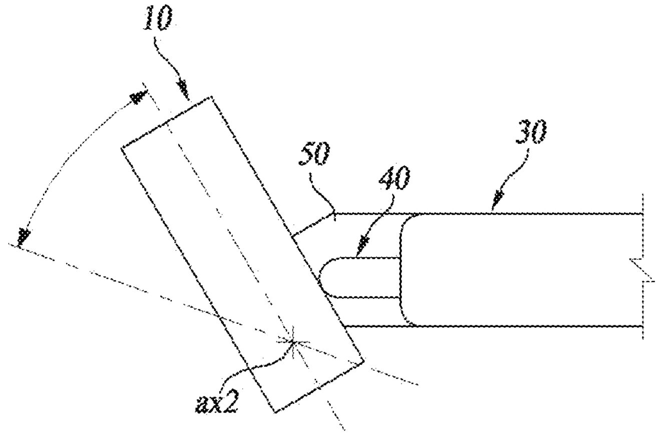
Figure 2C:
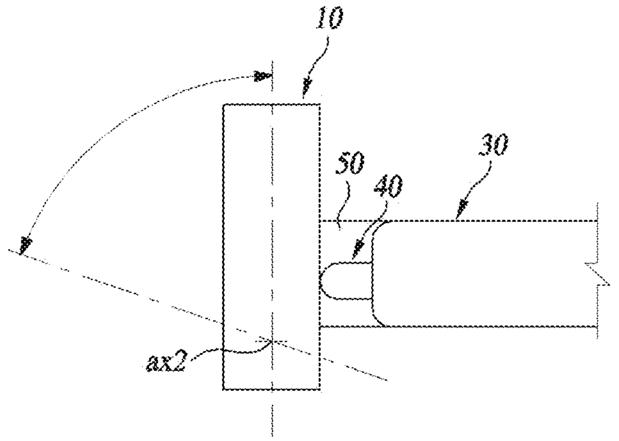

FIGS. 2A to 2C are schematic diagrams illustrating an example of a razor cartridge pivoting about a second pivot axis (second axis, ax2) according to one embodiment of the present disclosure.

Referring to FIGS. 2A to 2C, the frame 200 may be configured to pivot about the second pivot axis ax2 parallel to the longitudinal direction with respect to a razor handle by being connected to a connector coupled with one side of the razor handle.

However, it is not necessarily limited thereto, and the frame 200 may be configured to pivot about the razor handle about the second pivot axis ax2 parallel to the longitudinal direction by being directly connected to the razor handle.

Accordingly, the razor cartridge 10 according to one embodiment of the present disclosure may be configured to pivot not only about the first pivot axis ax1, that is, the vertical axis, but also about the second pivot axis ax2, that is, the horizontal axis.

In this case, a restoring force providing unit 40 may be provided in one side of a connector and/or the razor handle. For example, in FIGS. 2A to 2C, the restoring force providing unit 40 is illustrated as being provided in the connector, but is not necessarily limited thereto and may be provided on one side of the razor handle.

The restoring force providing unit 40 may provide a restoring force to return the razor cartridge 10 to the second rest position, for example, in a state where the frame 200 of the razor cartridge 10 pivots about the second pivot axis ax2 from the second rest position.

More specifically, the restoring force providing unit 40 may provide the restoring force to the razor cartridge 10 by elastically supporting an elastic force support portion 250 (refer to FIG. 4) described below.

In FIGS. 2A to 2C, the restoring force providing unit 40 is configured to move forward and backward as the razor cartridge 10 pivots about the second pivot axis ax2, thereby providing the restoring force. However, the present invention is not necessarily limited to this method of providing restoring force, as long as the razor cartridge 10 can be returned to the second rest position.

Below, detailed descriptions of the coupling and pivoting of the blade housing 100 and frame 200 are provided through various examples.

Figure 3:
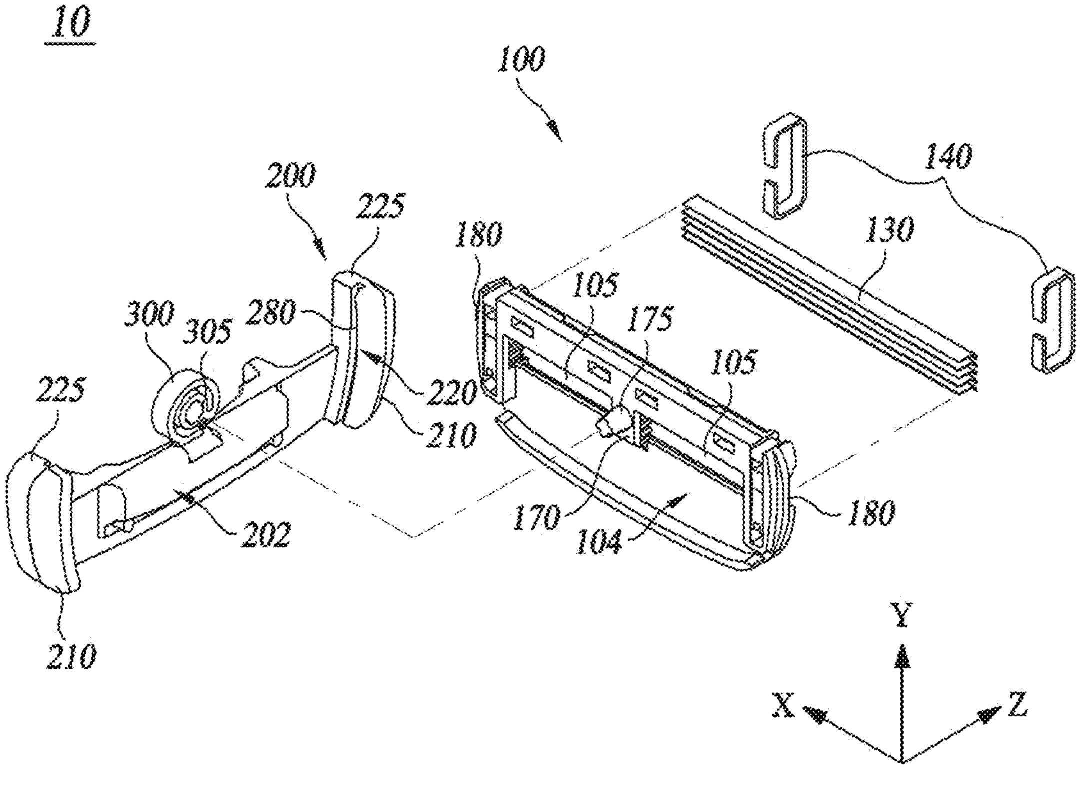
FIG. 3 is an exploded view of a razor cartridge according to one embodiment including a torsion spring.

FIG. 3 is an exploded view of a razor cartridge 10 according to one embodiment including a torsion spring 300.

Figure 4:
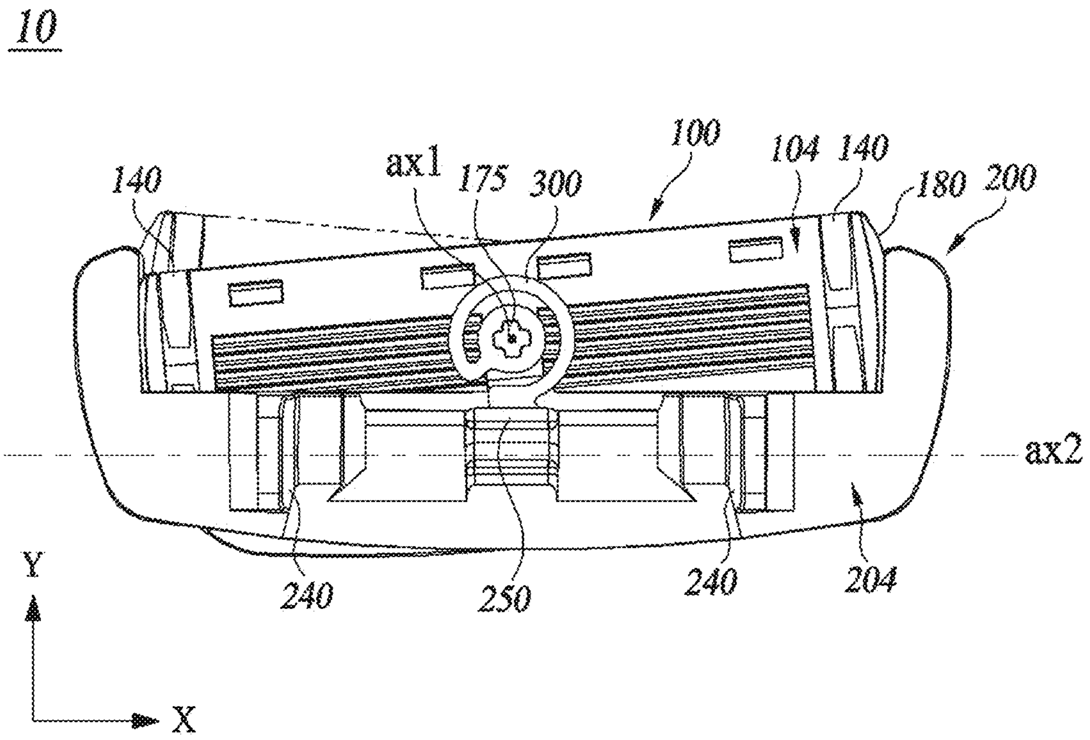
FIG. 4 is a view illustrating an example of a razor cartridge according to one embodiment including a torsion spring pivoting about the first pivot axis from below.

FIG. 4 is a view illustrating an example of the razor cartridge 10 according to one embodiment including a torsion spring 300 pivoting about the first pivot axis ax1 from below.

Referring to FIGS. 3 and 4, the torsion spring 300 is illustrated as an example of the first restoring force providing unit. The torsion spring 300 may be formed integrally with the blade housing 100 or the frame 200 such that a first pivot axis ax1 passes through the center of the torsion spring 300. The torsion spring 300 may be deformed due to the pivoting of the blade housing 100 and the frame 200 with respect to each other.

For example, when the blade housing 100 pivots about the first pivot axis ax1 with respect to the frame 200, the torsion spring 300 may also twist in the direction of the pivoting, and the restoring force may be generated according to the degree of twisting.

In addition, the torsion spring 300 may provide a restoring force to the blade housing 100 even when the blade housing 100 is translated in the direction parallel to the shaving direction with respect to the frame 200. In this case, the torsion spring 300 may provide the restoring force to the blade housing 100 not only for the pivoting about the first pivot axis ax1 of the blade housing 100 but also for the translation in the direction parallel to the shaving direction.

However, it is not necessary that only the torsion spring 300 provide the restoring force for the translation in the direction parallel to the shaving direction of the blade housing 100, and a separate elastic member may be additionally included in the razor cartridge 10 to provide the restoring force for the translation.

In FIGS. 3 and 4, the torsion spring 300 is illustrated as being configured as an integral part with the frame 200, but is not necessarily limited thereto, and may be configured as an integral part with the blade housing 100 or may be arranged as a separate component from the frame 200 and the blade housing 100.

When the torsion spring 300 is configured as an integral part with the frame 200, the blade housing 100 may include a coupling protrusion 175 formed to protrude from at least one surface thereof in a direction parallel to the first pivot axis ax1. In this case, the coupling protrusion 175 may be coupled with a spring groove 305 formed to penetrate the center of the torsion spring 300 to form the first pivot axis ax1.

As the coupling protrusion 175 is coupled with the spring groove 305, not only is the coupling of the blade housing 100 and the frame 200 possible, but the position of the first pivot axis ax1 can also be determined. Meanwhile, the spring groove 305 may be configured to penetrate the torsion spring 300, but is not necessarily limited thereto, and a portion of the torsion spring 300 may be recessed to from the spring groove.

In addition, the blade housing 100 may include a first central support unit 170 configured to support at least one razor blade 130 at the central region in the longitudinal direction. When the first central support unit is included, the coupling protrusion 175 may be formed on the first central support unit 170.

More specifically, at least one razor blade 130 may be mounted on one surface of the first central support unit 170, and the coupling protrusion 175 may be formed on the other surface opposite to the one surface. In this case, the first pivot axis ax1 may penetrate the first central support unit 170.

However, the first pivot axis ax1 does not necessarily have to be configured to penetrate the first central support unit 170, and may be configured to penetrate the first lubrication band 160 or the second lubrication band 110 for appropriate pivot force adjustment, or the like.

Meanwhile, when the torsion spring 300 is configured as an integral part with the blade housing 100, the frame 200 may include a coupling protrusion 175, and the torsion spring 300 may be disposed on the other surface of the first central support unit 170.

The blade housing 100 may include a guide protrusion 180 formed by protruding from at least a portion of the outer surface. For example, a pair of guide protrusions 180 may be formed, each of which may protrude from one surface of both sides of the blade housing 100 in the longitudinal direction.

In response to this, at least one outer portion 220 may include a guide groove 280 formed by recessing at least a portion of an inner surface along the pivot direction with respect to the frame 200 of the blade housing 100. For example, when at least one outer portion 220 includes a pair of longitudinal portions 225, the guide groove 280 may be formed in each of the pair of longitudinal portions 225.

Since the guide protrusion 180 can move along the guide groove 280, it is possible to stably guide the pivoting of the blade housing 100 with respect to the frame 200.

At least one outer portion 220 may further include a stopper (not illustrated) protruding from the inner surface of the guide groove 280, and in this case, the stopper may limit the pivot of the blade housing 100 with respect to the frame 200.

For example, the stopper may be formed at one end portion of the guide groove 280 in the shaving direction and configured to engage with the guide protrusion 180 to limit the pivot range. The pivot range may be determined depending on the formation position of the stopper.

FIGS. 3 and 4 illustrate that the blade housing 100 includes the guide protrusion 180 and the frame 200 includes the guide groove 280, but this is not necessarily limited to this, and the blade housing 100 may include the guide groove 280 and the frame 200 may include the guide protrusion 180. In this case, the stopper may be formed in the blade housing 100.

Meanwhile, the blade housing 100 may include at least one central opening 105 that opens through the housing top surface 102 and the housing bottom surface 104. Shaving residues inside the razor cartridge 10 may be discharged to the outside through the at least one central opening 105.

When the blade housing 100 includes the first central support unit 170, at least one central opening 105 may include two central openings 105 spaced apart from each other in the longitudinal direction with the first central support unit 170 interposed therebetween.

Referring again to FIG. 4, the frame 200 may be configured to pivot about the second pivot axis ax2 parallel to the longitudinal direction with respect to the razor handle by being connected to the razor handle or to a connector coupled with one side of the razor handle.

In this case, the frame 200 may include a connecting portion 240 and an elastic force support portion 250 disposed on the frame bottom surface 204.

The connecting portion 240 may be configured to be connected to a razor handle or a connector coupled with one side of the razor handle. By connecting the razor handle or the connector to the connecting portion 240, the pivoting of the razor cartridge 10 about the second pivot axis ax2 with respect to the razor handle may be enabled.

The elastic force support portion 250 may be positioned in front of the first pivot axis ax1 in the shaving direction, and the restoring force may be applied to the elastic force support portion 250 to return the frame 200 to the second rest position in a state where the frame 200 pivots about the second pivot axis ax2 from the second rest position. In addition, the second pivot axis ax2 can be positioned in front of the first pivot axis ax1 in the shaving direction.

Accordingly, interference between the pivoting about the first pivot axis ax1 and the pivoting about the second pivot axis ax2 can be minimized, and the restoring force for returning to the first rest position may be applied to a point where the coupling protrusion 175 is formed, and the restoring force for returning to the second rest position may be applied to a point where the elastic force support portion 250 is formed.

However, it is not necessary for the elastic force support portion 250 to be positioned in front of the first pivot axis ax1 or for the second pivot axis ax2 to be positioned in front of the first pivot axis ax1, and the relative positions of each may be changed depending on the structure of the blade housing 100 and the frame 200.

Figure 5:
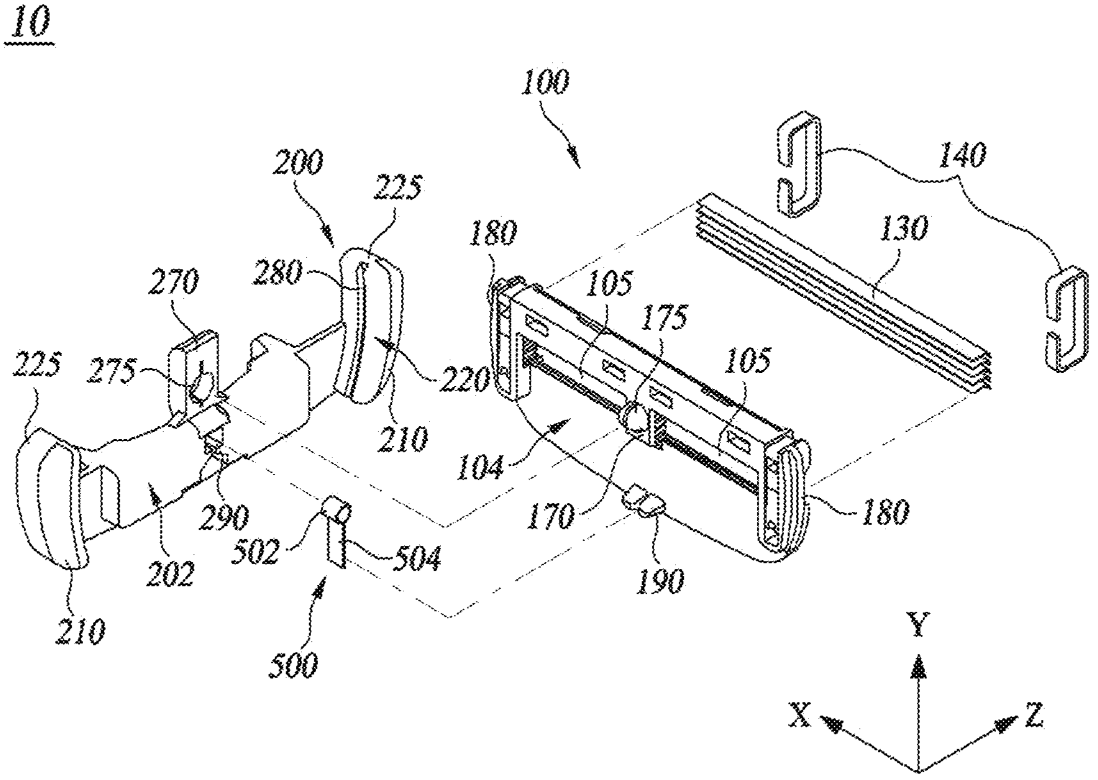
FIG. 5 is an exploded view of a razor cartridge according to one embodiment including a first leaf spring.

FIG. 5 is an exploded view of the razor cartridge 10 according to one embodiment including a first leaf spring 500.

Figure 6:
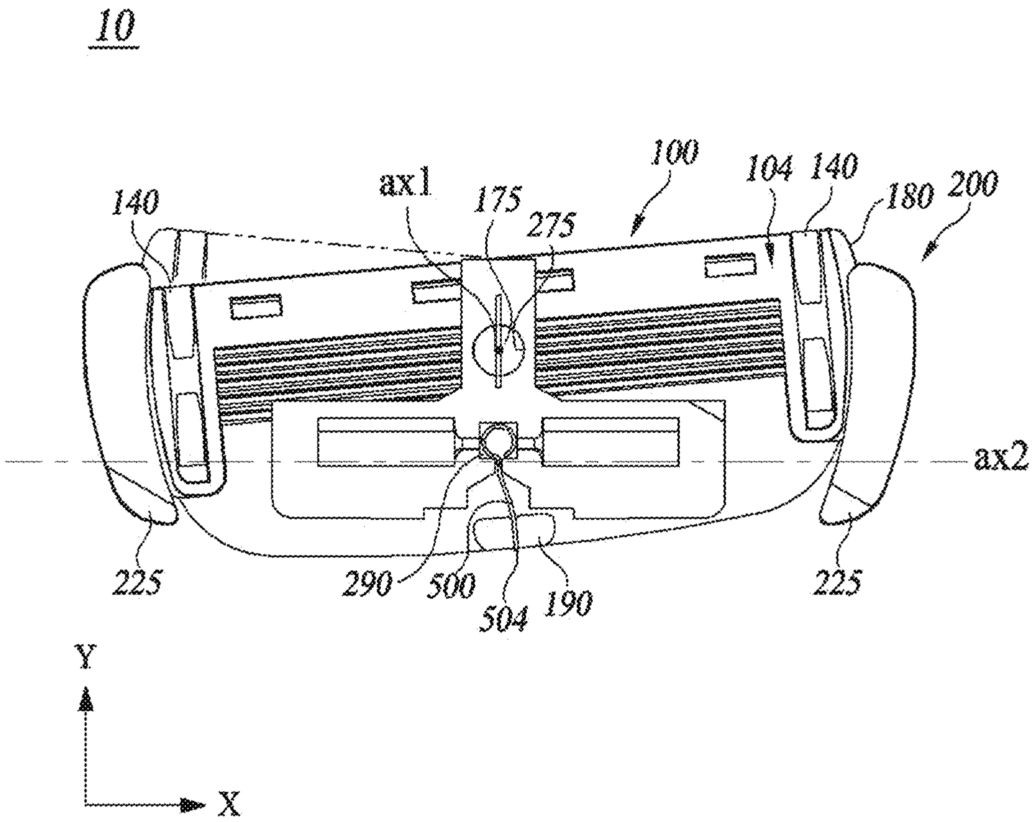
FIG. 6 is a view in which an example of a razor cartridge according to one embodiment including a first leaf spring pivoting about the first pivot axis is taken along line A-A' of FIG. 1A and viewed from below.

FIG. 6 is a view in which an example of a razor cartridge 10 according to one embodiment including the first leaf spring 500 pivoting about the first pivot axis ax1 is taken along line A-A' of FIG. 1A and viewed from below.

Referring to FIGS. 5 and 6, as an example of a restoring force providing unit, the first leaf spring 500 is illustrated, at least a portion of which may be configured to extend in a transverse direction perpendicular to the longitudinal direction, for example, in the direction parallel to the shaving direction. The first leaf spring 500 may be configured such that at least a portion is fixedly positioned on the blade housing 100 or the frame 200, and at least another portion is deformed due to the pivoting of the blade housing 100 and the frame 200 with respect to each other.

For example, when the blade housing 100 pivots about the first pivot axis ax1 with respect to the frame 200, at least a portion of the first leaf spring 500 may be deformed in the pivot direction, and the restoring force may be generated according to the degree of deformation.

In FIGS. 5 and 6, the first leaf spring 500 is illustrated as a separate configuration from the frame 200 and the blade housing 100, but it may also be configured as an integral part of the blade housing 100 or the frame 200.

When the first leaf spring 500 is configured separately from the frame 200 and the blade housing 100, one side of the first leaf spring 500 in the shaving direction may be configured to be fixed to the blade housing 100 and the other side thereof may be fixed to the frame 200.

For example, the blade housing 100 may include a first accommodation portion 190 formed on the housing bottom surface 104 and configured to accommodate at least a portion of the first leaf spring 500, and the frame 200 may include a second accommodation portion 290 formed on the frame top surface 202 and configured to accommodate at least another portion of the first leaf spring 500.

Accordingly, when the blade housing 100 and the frame 200 are coupled with each other by the first accommodation portion 190 and the second accommodation portion 290, the first leaf spring 500 may be accommodated therebetween.

As illustrated in FIGS. 5 and 6, the first leaf spring 500 may include a head portion 502 and a body portion 504. For example, the head portion 502 may be formed on one side of the first leaf spring 500 in the shaving direction, and the body portion 504 may be formed on the other side thereof.

In this case, the body portion 504 may extend in a direction parallel to the shaving direction, and a head portion 502 having a circular cross-section may be formed at one end of the body portion 504, but is not necessarily limited thereto. For example, the first leaf spring 500 may not include the head portion 502, and in this case, the first leaf spring 500 may have a shape that extends long in the direction parallel to the shaving direction as a whole.

In addition, the first accommodation portion 190 may accommodate the body portion 504, and the second accommodation portion 290 may accommodate the head portion 502, but this is not necessarily limited to this, and vice versa.

When the head portion 502 is accommodated in the second accommodation portion 290, the second accommodation portion 290 is configured so that at least a portion thereof is recessed from the frame top surface 202 so as to fix the position of the head portion 502. The first accommodation portion 190 may be configured to protrude from the housing bottom surface 104 so as to accommodate the body portion 504, and the body portion 504 accommodated in the first accommodation portion 190 may be at least partially deformed due to the pivoting of the blade housing 100 with respect to the frame 200.

Meanwhile, in order for the blade housing 100 and the frame 200 to be coupled with each other, one of the blade housing 100 and the frame 200 may include the coupling protrusion 175 formed to protrude from at least one surface thereof in a direction parallel to the first pivot axis ax1. In addition, the other of the blade housing 100 and the frame 200 may include a coupling groove 275 formed to be recessed in at least a portion thereof in a shape corresponding to the coupling protrusion 175.

The coupling protrusion 175 and the coupling groove 275 may be coupled with each other to form the first pivot axis ax1. Therefore, when the coupling protrusion 175 is coupled with the coupling groove 275, not only is the coupling between the blade housing 100 and the frame 200 possible, but also the position of the first pivot axis ax1 can be determined.

Meanwhile, although not illustrated in the drawing, the coupling groove 275 may be formed to be long in the direction parallel to the shaving direction for the translation of the blade housing 100 in the direction parallel to the shaving direction. In this case, the coupling protrusion 175 may be moved along the extension direction of the coupling groove 275, so that translation of the blade housing 100 in the direction parallel to the shaving direction may be possible.

In this case, the razor cartridge 10 may further include a separate elastic member to provide a restoring force for the translation of the blade housing 100 in the direction parallel to the shaving direction.

FIGS. 5 and 6 illustrate the blade housing 100 includes the coupling protrusion 175 and the frame 200 includes the coupling groove 275, but conversely, the frame 200 may include the coupling protrusion 175 and the blade housing 100 may include the coupling groove 275.

When the blade housing 100 includes the first central support unit 170, for example, at least one razor blade 130 may be mounted on one surface of the first central support unit 170, and the coupling protrusion 175 may be formed on the other surface opposite to that surface. In this case, the first pivot axis ax1 may penetrate the first central support unit 170.

However, the first pivot axis ax1 does not necessarily have to be configured to penetrate the first central support unit 170, and may be configured to penetrate the first lubrication band 160 or the second lubrication band 110 for appropriate pivot force adjustment, or the like.

Additionally, the frame 200 may include a second central support unit 270. The second central support unit 270 may be positioned in a region corresponding to the first central support unit 170 when the blade housing 100 and the frame 200 are coupled with each other, and one surface of the second central support unit 270 may be configured to be coupled with the first central support unit 170.

In this case, the coupling protrusion 175 may be formed on the first central support unit 170, and the coupling groove 275 may be formed on the second central support unit 270. The coupling groove 275 may be formed so that a portion thereof is recessed from one surface of the second central support unit 270, but is not necessarily limited thereto, and may be configured to penetrate the second central support unit 270.

Meanwhile, when the frame 200 includes the elastic force support portion 250, the elastic force support portion 250 may be located on one surface of the second central support unit 270, that is, on the other surface opposite to the surface facing the housing bottom surface 104.

Except for the matters described above, the descriptions related to the guide protrusion 180, the guide groove 280, the at least one central opening 105, the second pivot axis ax2, the connecting portion 240, and the elastic force support portion 250 may be the same as the descriptions for the embodiment including the torsion spring 300 described above, and therefore, will be omitted here.

Figure 7:
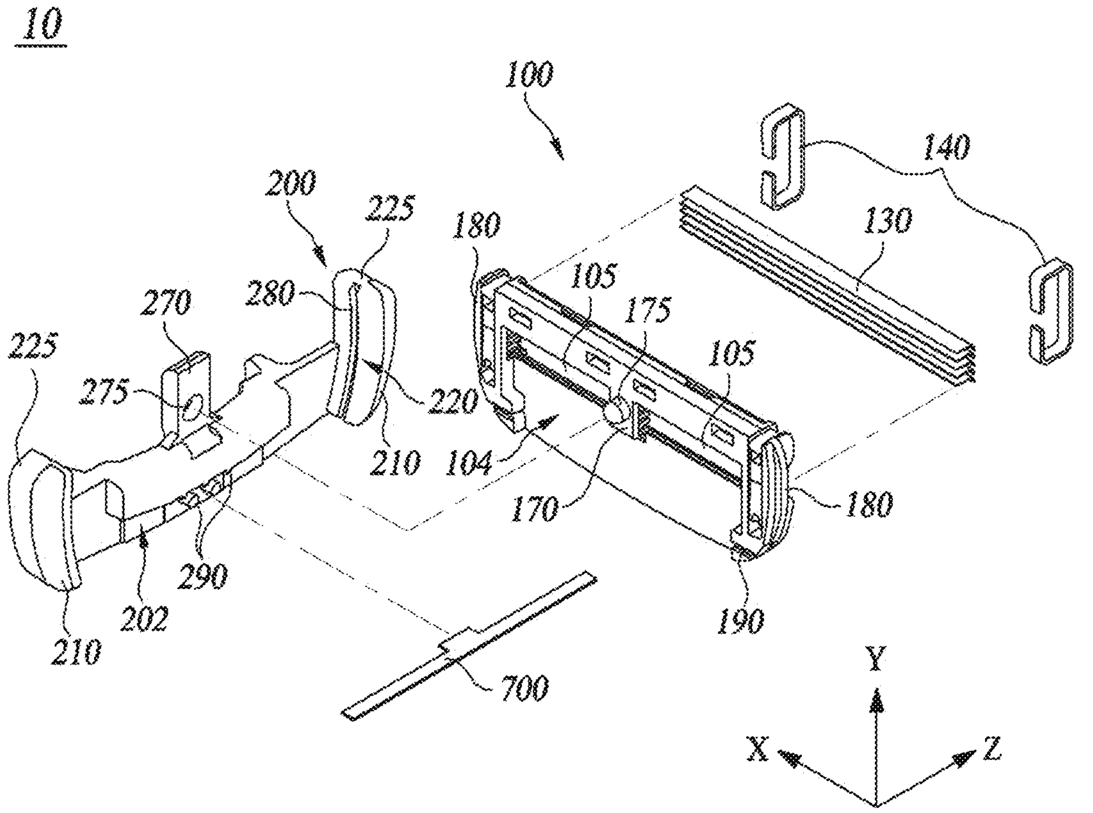
FIG. 7 is an exploded view of a razor cartridge according to one embodiment including a second leaf spring.

FIG. 7 is an exploded view of the razor cartridge 10 according to one embodiment including a second leaf spring 700.

Figure 8:
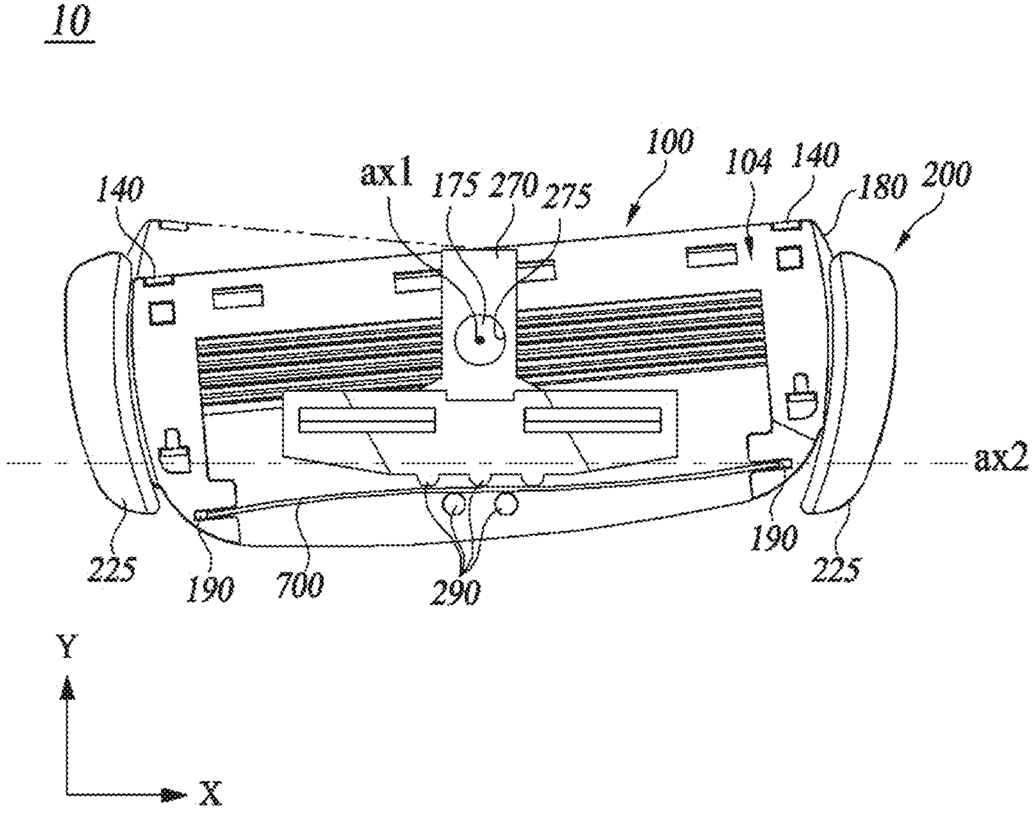
FIG. 8 is a view in which an example of the razor cartridge according to one embodiment including the second leaf spring pivoting about the first pivot axis is taken along line A-A' of FIG. 1A and viewed from below.

FIG. 8 is a view in which an example of the razor cartridge 10 according to one embodiment including the second leaf spring 700 pivoting about the first pivot axis ax1 is taken along line A-A' of FIG. 1A and viewed from below.

Referring to FIGS. 7 and 8, the second leaf spring 700 is illustrated as an example of the first restoring force providing unit, and at least a portion of the second leaf spring may be configured to extend in the direction parallel to the longitudinal direction. The second leaf spring 700 may be configured such that at least a portion thereof is fixedly positioned on the blade housing 100 or the frame 200, and at least another portion thereof is deformed due to the pivoting of the blade housing 100 and the frame 200 with respect to each other.

For example, when the blade housing 100 pivots about the first pivot axis ax1 with respect to the frame 200, at least a portion of the second leaf spring 700 may be deformed in the pivot direction, and the restoring force may be generated according to the degree of deformation.

In FIGS. 7 and 8, the second leaf spring 700 is illustrated as a separate configuration from the frame 200 and the blade housing 100, but it may also be configured as an integral part of the blade housing 100 or the frame 200.

When the second leaf spring 700 is configured separately from the frame 200 and the blade housing 100, the central region of the second leaf spring 700 in the longitudinal direction may be fixed to the blade housing 100 and both sides of the second leaf spring may be fixed to the frame 200.

However, it is not necessarily limited to this, and the central region of the second leaf spring 700 in the longitudinal direction may be fixed to the frame 200, and both sides thereof may be fixed to the blade housing 100.

The blade housing 100 may include the first accommodation portion 190 formed on the housing bottom surface 104 and configured to accommodate at least a portion of the second leaf spring 700, and the frame 200 may include the second accommodation portion 290 formed on the frame top surface 202 and configured to accommodate at least another portion of the second leaf spring 700.

Accordingly, when the blade housing 100 and the frame 200 are coupled with each other by the first accommodation portion 190 and the second accommodation portion 290, the second leaf spring 700 can be accommodated therebetween.

When the central region of the second leaf spring 700 in the longitudinal direction is accommodated in the second accommodation portion 290, the second accommodation portion 290 is configured to protrude from the frame top surface 202 so as to fix the position of the central region of the second leaf spring 700 in the longitudinal direction. The first accommodation portion 190 is configured so that at least a portion thereof is recessed from the housing bottom surface 104 so as to accommodate both sides of the second leaf spring 700 in the longitudinal direction, and at least a portion of the second leaf spring 700 may be deformed due to the pivoting of the blade housing 100 with respect to the frame 200.

Meanwhile, when the coupling groove 275 is formed to be long in the direction parallel to the shaving direction, the second leaf spring 700 can provide the restoring force not only for the pivoting about the first pivot axis ax1 of the blade housing 100 but also for the translation in the direction parallel to the shaving direction.

However, it is not necessary that only the second leaf spring 700 provide the restoring force for the translation in the direction parallel to the shaving direction of the blade housing 100, and a separate elastic member may be additionally included in the razor cartridge 10 to provide the restoring force.

Except for the matters described above, descriptions related to the coupling protrusion 175, the coupling groove 275, the first central support unit 170, the second central support unit 270, the guide protrusion 180, the guide groove 280, the at least one central opening 105, the second pivot axis ax2, the connecting portion 240, and the elastic force support portion 250 may be the same as the descriptions for the embodiment including the first leaf spring 500 described above, and therefore are omitted herein.

In one embodiment of the present disclosure illustrated in FIGS. 9 to 14, the first restoring force providing unit is characterized in that the first restoring force providing unit includes an elastic portion. The elastic portion includes a fixed end whose position is fixed to the blade housing 100 or the frame 200, and a free end whose position is not fixed. When the blade housing 100 pivots about the first pivot axis ax1 with respect to the frame 200, at least a portion of the elastic portion may be elastically deformed, thereby providing the restoring force for the pivoting about the first pivot axis ax1. Hereinafter, various embodiments of the elastic portion will be described with reference to FIGS. 9 to 14.

Figure 9:
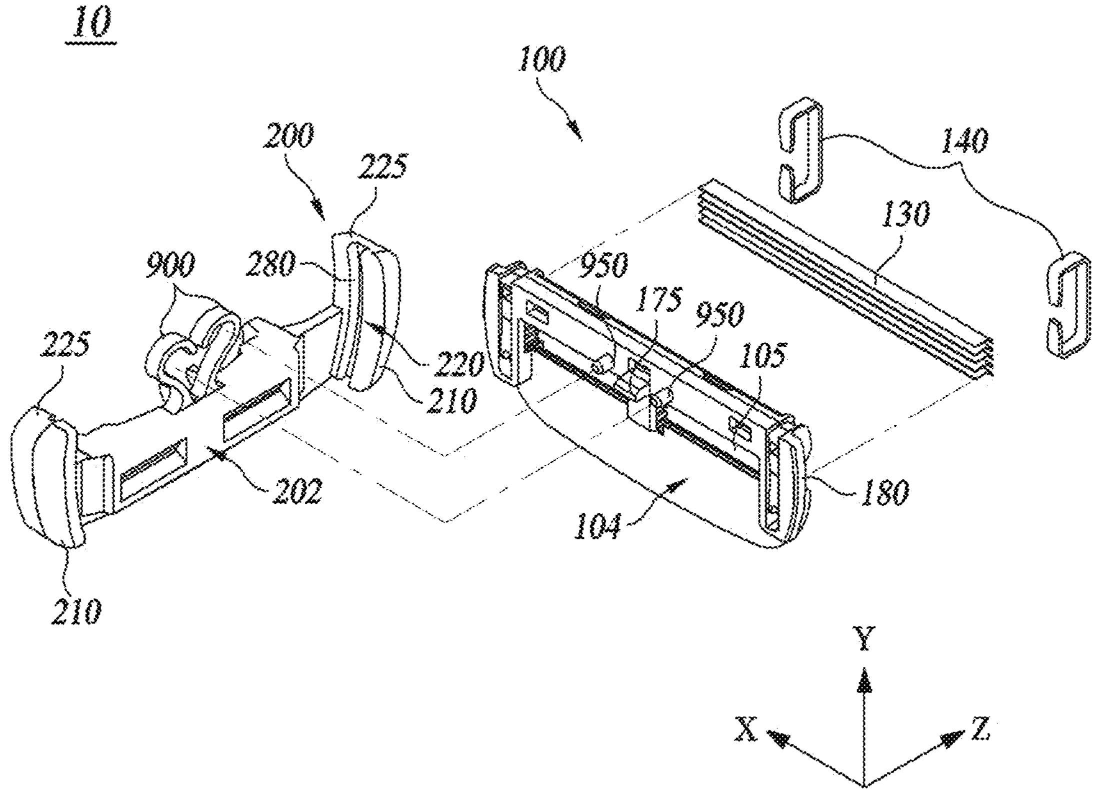
FIG. 9 is an exploded view of a razor cartridge according to one embodiment including a pair of first elastic portions.

FIG. 9 is an exploded view of the razor cartridge 10 according to one embodiment including a pair of first elastic portions 900.

Figure 10:
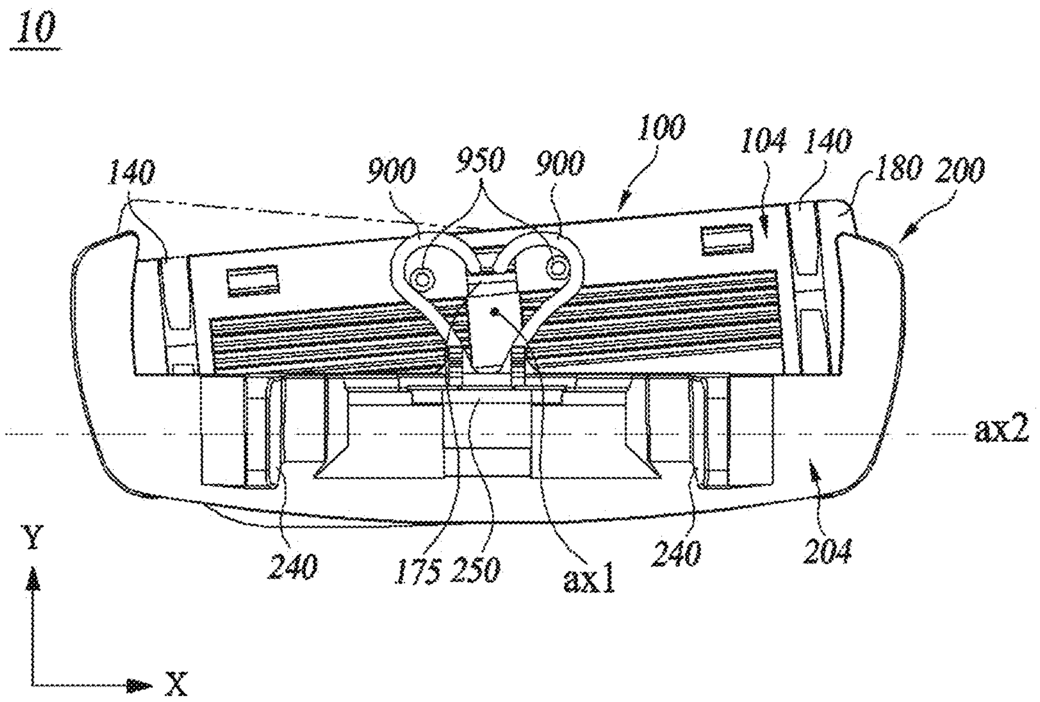
FIG. 10 is a view in which an example of the razor cartridge according to one embodiment including a pair of first elastic portions pivoting about the first pivot axis is taken along line A-A' of FIG. 1A and viewed from below.

FIG. 10 is a view in which an example of the razor cartridge 10 according to one embodiment including a pair of first elastic portions 900 pivoting about the first pivot axis ax1 is taken along line A-A' of FIG. 1A and viewed from below.

Referring to FIGS. 9 and 10, as an example of a first restoring force providing unit, the pair of first elastic portions 900 that are formed to be spaced apart from each other in the longitudinal direction and extend substantially in the transverse direction is illustrated. Each of the pair of first elastic portions 900 may be configured such that one side thereof is fixed to the frame 200 and the other side thereof forms a free end.

For example, when the blade housing 100 pivots about the first pivot axis ax1 with respect to the frame 200, at least one free end of the pair of first elastic portions 900 may be deformed in the pivot direction or in the direction opposite to the pivot direction by the coupling protrusion 175, and a restoring force may be generated depending on the degree of deformation.

In this case, the coupling protrusion 175 may be configured to be in contact with the free ends of the pair of first elastic portions 900. In FIGS. 9 and 10, one side of each of the pair of first elastic portions 900 is illustrated as being fixed to the frame 200, but is not necessarily limited thereto, and the one side may be fixed to the blade housing 100 as long as it is configured to be able to deform a portion of the pair of first elastic portions 900 according to the pivoting.

Additionally, each of the pair of first elastic portions 900 may be configured so that at least a portion thereof is bent. However, it is not necessarily limited thereto, and may be configured in a straight-line shape parallel to one direction.

When at least a portion of each of the pair of first elastic portions 900 is configured to be bent, a pair of bending region support units 950 configured to support the bent regions of the pair of first elastic portions 900 may be formed to protrude from the housing bottom surface 104.

The pair of bending region support units 950 may limit the pivot regions of the pair of first elastic portions 900. For example, the deformation range of the first elastic portion 900 may change depending on the position, size, and shape of the bending region support unit 950, and accordingly, the limitation to the pivot range of the blade housing 100 may also be changed.

In addition, when the blade housing 100 pivots about the first pivot axis ax1 with respect to the frame 200 and then the external force is removed, the pair of bending region support units 950 may provide a restoring force to the pair of first elastic portions 900, thereby allowing the blade housing 100 to return to the first rest position.

Meanwhile, in FIGS. 9 and 10, each of a pair of first elastic portions 900 is illustrated as having a shape symmetrical to each other at the first rest position, but is not necessarily limited thereto.

Except for the matters described above, descriptions related to the guide protrusion 180, the guide groove 280, the at least one central opening 105, the second pivot axis ax2, the connecting portion 240 and the elastic force support portion 250 may be the same as the descriptions of the embodiment including the torsion spring 300 described above, and therefore are omitted here.

Figure 11:
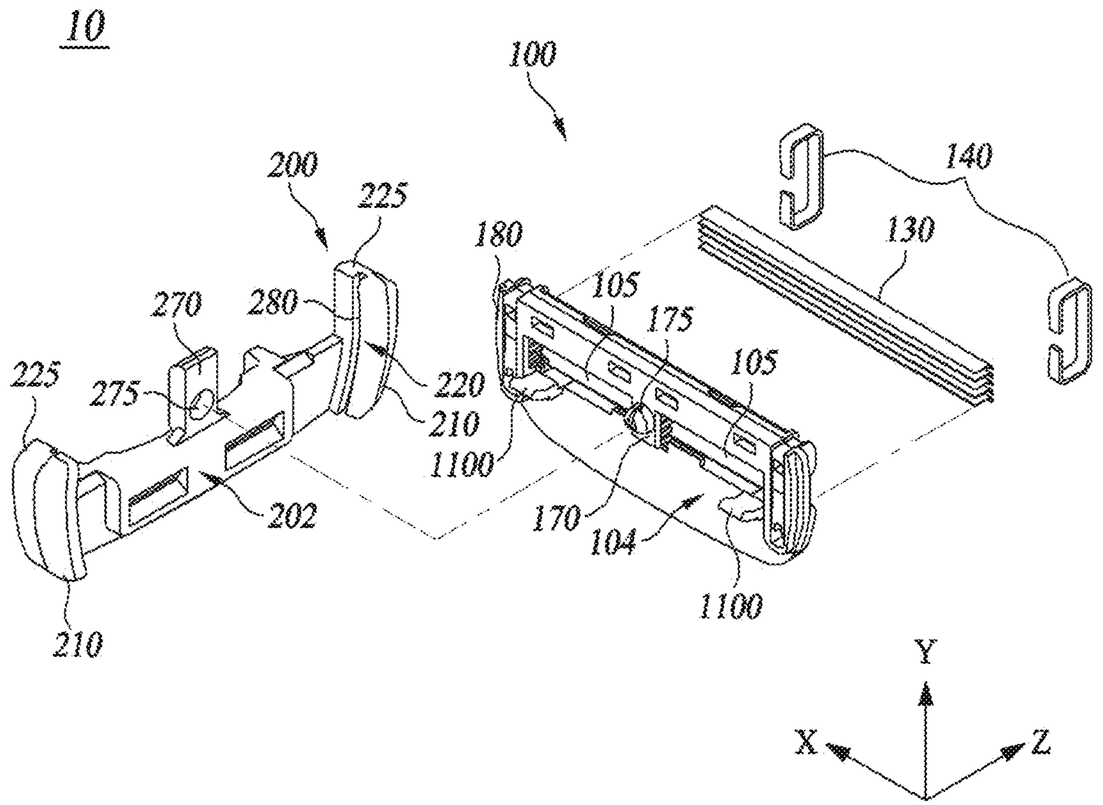
FIG. 11 is an exploded view of a razor cartridge according to one embodiment including a pair of second elastic portions.

FIG. 11 is an exploded view of the razor cartridge 10 according to one embodiment including a pair of second elastic portions 1100.

Figure 12:
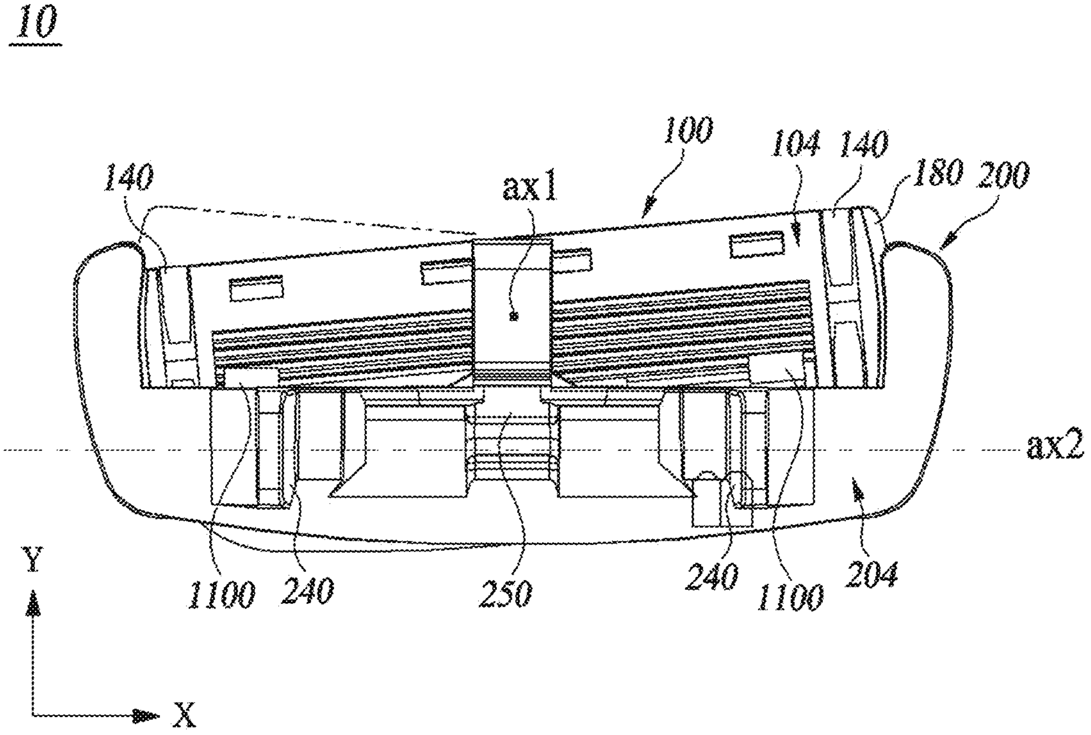
FIG. 12 is a view in which an example of the razor cartridge according to one embodiment including the pair of second elastic portions pivoting about the first pivot axis is taken along line A-A' of FIG. 1A, and viewed from below.

FIG. 12 is a view in which an example of the razor cartridge 10 according to one embodiment including the pair of second elastic portions 1100 pivoting about the first pivot axis ax1 is taken along line A-A' of FIG. 1A, and viewed from below.

Referring to FIGS. 11 and 12, as an example of the first restoring force providing unit, the pair of second elastic portions 1100 that are formed spaced apart from each other in a longitudinal direction and extend substantially in the height direction are illustrated. Each of the pair of second elastic portions 1100 may be configured such that one side is fixed to the blade housing 100 and the other side forms a free end.

For example, when the blade housing 100 pivots about the first pivot axis ax1 with respect to the frame 200, at least one of the pair of second elastic portions 1100 may be deformed laterally by the frame 200, and the restoring force may be generated depending on the degree of deformation. In this case, the frame 200 may be configured to come into contact with the free ends of the pair of second elastic portions 1100 when coupled with the blade housing 100.

Meanwhile, the pivot range of the blade housing 100 may be changed depending on the position, size, and shape of the pair of second elastic portions 1100. In addition, the positions of the pair of second elastic portions 1100 illustrated in FIGS. 11 and 12 may be changed in the transverse or longitudinal direction within a range that maintains the pivot angle θ of the blade housing 100 of 1° to 20° as described above.

In FIGS. 11 and 12, one side of each of the pair of second elastic portions 1100 is illustrated as being fixed to the blade housing 100, but is not necessarily limited thereto, and may be fixed to the frame 200 as long as it is configured to be able to deform a portion of each of the pair of second elastic portions 1100 according to the pivoting.

Additionally, the pair of second elastic portions 1100 may be formed integrally with the guard 120, but is not necessarily limited thereto.

Except for the matters described above, descriptions related to the coupling protrusion 175, the coupling groove 275, the first central support unit 170, the second central support unit 270, the guide protrusion 180, the guide groove 280, the at least one central opening 105, the second pivot axis ax2, the connecting portion 240 and the elastic force support portion 250 may be the same as the descriptions for the embodiment including the second leaf spring 700 described above, and therefore are omitted herein.

Figure 13:
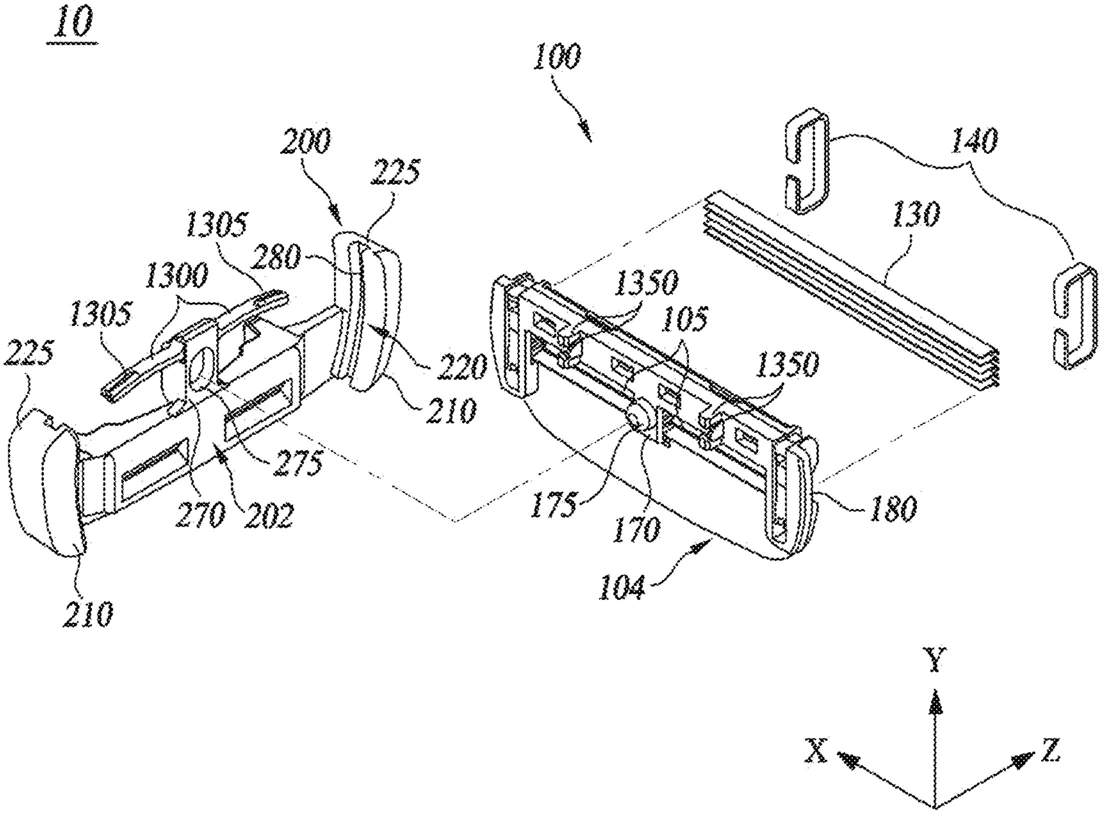
FIG. 13 is an exploded view of a razor cartridge according to one embodiment including a pair of third elastic portions.

FIG. 13 is an exploded view of the razor cartridge 10 according to one embodiment including a pair of third elastic portions 1300.

Figure 14:
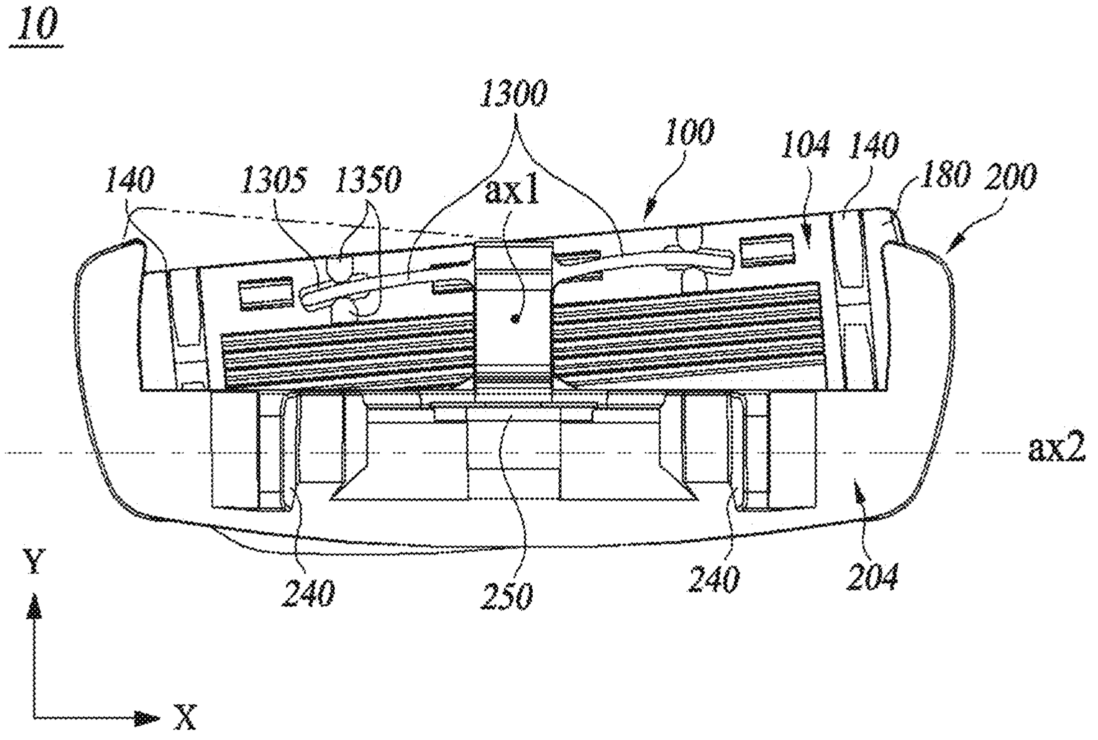
FIG. 14 is a view in which an example of the razor cartridge according to one embodiment including the pair of third elastic portions pivoting about the first pivot axis is taken along line A-A' of FIG. 1A and viewed from below.

FIG. 14 is a view in which an example of the razor cartridge 10 according to one embodiment including the pair of third elastic portions 1300 pivoting about the first pivot axis is taken along line A-A' of FIG. 1A and viewed from below.

Referring to FIGS. 13 and 14, as an example of the first restoring force providing unit, the pair of third elastic portions 1300 extending substantially in the longitudinal direction from both sides of the second central support unit 270 in the longitudinal direction are illustrated. Each of the pair of third elastic portions 1300 may be configured such that one side thereof is fixed to the frame 200 and the other side thereof forms a free end.

For example, when the blade housing 100 pivots about the first pivot axis ax1 with respect to the frame 200, at least one of the pair of third elastic portions 1300 may be deformed in the pivot direction or in the direction opposite to the pivot direction by a pair of elastic portion accommodation units 1350 formed on the housing bottom surface 104, and the restoring force may be generated depending on the degree of deformation. In this case, each of the pair of elastic portion accommodation units 1350 may be configured to be accommodated by fitting each of the pair of third elastic portions 1300 in the height direction.

Meanwhile, the pivot range of the blade housing 100 may be changed depending on the position, size, and shape of the pair of third elastic portions 1300. In addition, in the free end side of the pair of third elastic portions 1300 illustrated in FIGS. 13 and 14, the position of the free end side may be changed in the transverse or longitudinal direction within a range that maintains the pivot angle θ of the blade housing 100 of 1° to 20° as described above.

In FIGS. 13 and 14, one side of each of the pair of third elastic portions 1300 is illustrated as being fixed to the frame 200, but it is not necessarily limited thereto, and the one side may be fixed to the blade housing 100 as long as a portion of each of the pair of third elastic portions 1300 is configured to be deformable according to the pivoting.

In addition, to prevent the pair of third elastic portions 1300 from being separated in a state of being accommodated in the pair of elastic portion accommodation units 1350, each of the pair of third elastic portions 1300 may include an elastic portion separation preventing unit 1305 formed on at least one surface.

Even when an external force in the height direction is applied to the pair of third elastic portions 1300, a state where the pair of third elastic portions 1300 is accommodated in the pair of elastic portion accommodation units 1350 can be maintained by the elastic portion separation prevention unit 1305, and further, separation of the frame 200 and the blade housing 100 can be prevented.

Except for the matters described above, descriptions related to the coupling protrusion 175, the coupling groove 275, the first central support unit 170, the second central support unit 270, the guide protrusion 180, the guide groove 280, the at least one central opening 105, the second pivot axis ax2, the connecting portion 240 and the elastic force support portion 250 may be the same as the descriptions for the embodiment including the second leaf spring 700 described above, and therefore are omitted herein.

Figure 15:
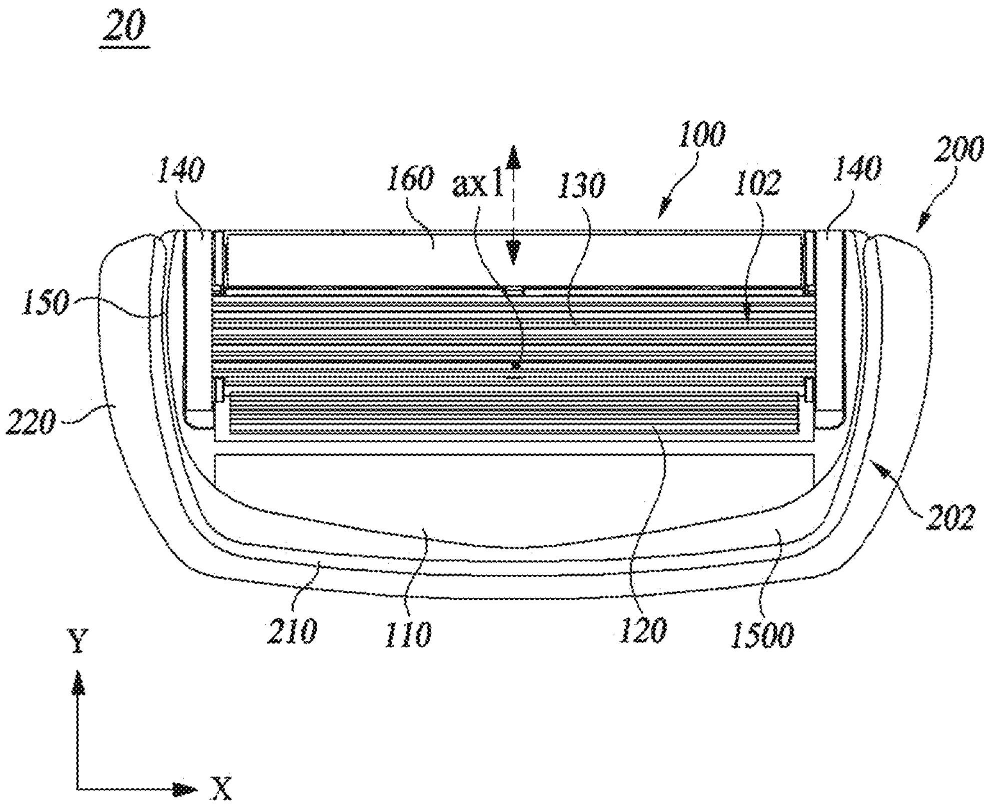
FIG. 15 is a combined perspective view of a razor cartridge according to another embodiment of the present disclosure.

FIG. 15 is a couple perspective view of a razor cartridge 20 according to another embodiment of the present disclosure.

Figure 16:
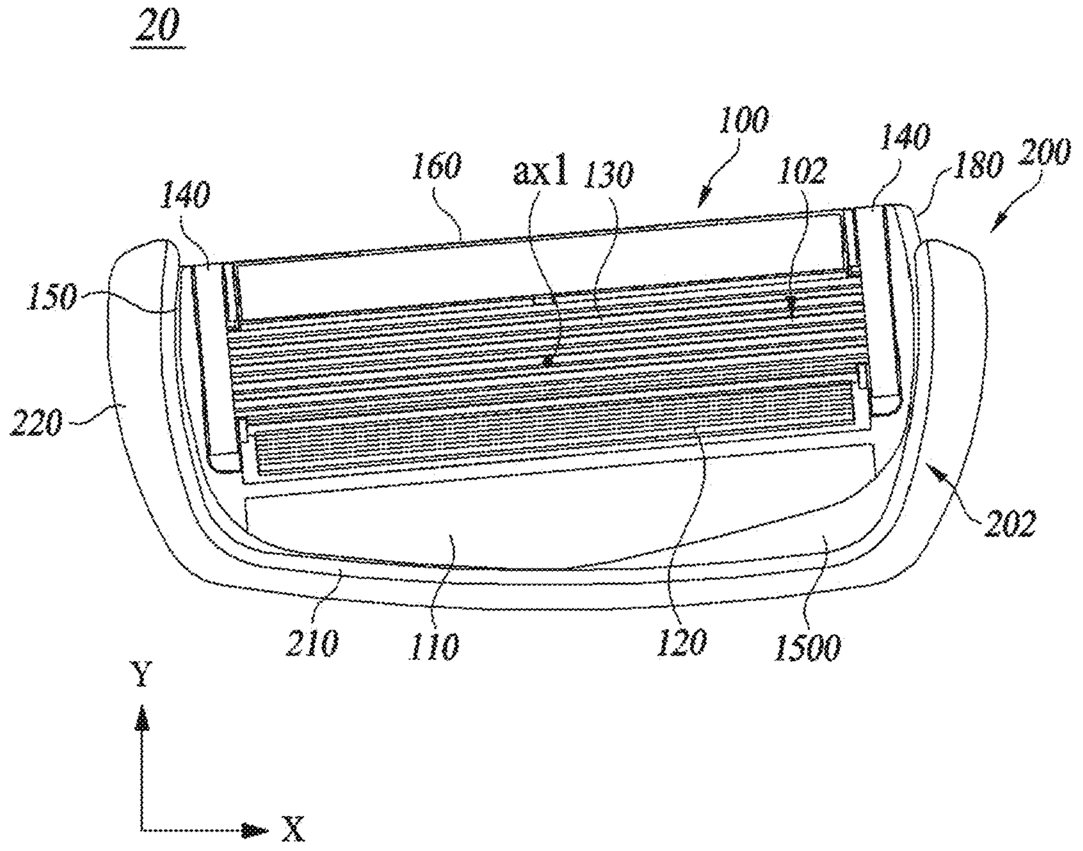
FIG. 16 is a view in which an example of a razor cartridge according to another embodiment of the present disclosure pivoting about the first pivot axis is viewed from above.

FIG. 16 is a view in which an example of the razor cartridge 20 according to another embodiment of the present disclosure pivoting about the first pivot axis is viewed from above.

Referring to FIGS. 15 and 16, the razor cartridge 20 according to another embodiment of the present disclosure has at least a portion of at least one outer portion 220 disposed in front of the blade housing 100 in the shaving direction. For example, at least one outer portion 220 may be configured to surround both sides and the front of the blade housing 100 in the longitudinal direction.

In this case, the third lubricating band 210 may be configured to be adjacent to both sides and the front of the blade housing 100 in the longitudinal direction on the top surface of at least one outer portion 220. Accordingly, the lubricant can be applied more widely around the user's skin where shaving is performed.

However, it is not necessary that the third lubrication band 210 is configured to be adjacent to both sides and the front of the blade housing 100 in the longitudinal direction on the top surface of at least one outer portion 220. For example, the third lubrication band 210 may be configured to be adjacent to the outer surface of at least one outer portion 220 on the top surface of at least one outer portion 220.

In addition, the shape of at least one outer portion 220 is not necessarily limited to that illustrated in FIGS. 15 and 16, and at least a portion of at least one outer portion 220 may be positioned at the rear of the blade housing 100 in the shaving direction, and at least one outer portion 220 may be configured to surround the entire outer surface of the blade housing 100 in the form of a closed loop.

Meanwhile, the razor cartridge 20 according to another embodiment may include a gap 1500 that is open in the height direction between the front and/or rear of the blade housing 100 and at least one outer portion 220.

In FIGS. 15 and 16, it is illustrated that one gap 1500 is formed, but it is also possible to form them to be separated from each other in the longitudinal direction by the guard 120 or the second lubricating band 110.

Since the gap 1500 is open in the height direction of the razor cartridge 20, shaving residues can be easily discharged through the gap 1500. In addition, the gap 1500 can provide a space in which the blade housing 100 can pivot with respect to the frame 200.

In addition, it is possible to limit the pivot range of the blade housing 100 depending on the size of the gap 1500. For example, referring to FIG. 16, when the blade housing 100 pivots to the maximum, the pivot range can be limited by the front side of the blade housing 100 and at least one outer portion 220 coming into contact, and the point at which the two components come into contact may be changed depending on the size of the gap 1500.

The razor cartridge 20 according to another embodiment of the present disclosure may have the configuration and technical features included in the razor cartridge 10 according to one embodiment of the present disclosure, except for the matters described above. Since the configuration and technical features related to the razor cartridge 20 may be the same as the description of the razor cartridge 10 according to one embodiment of the present disclosure, the configuration and technical features are omitted herein.

The spirit of the present embodiment is illustratively described hereinabove. It will be appreciated by those skilled in the art to which the present embodiment pertains that various modifications and alterations may be made without departing from the essential characteristics of the present embodiment. Accordingly, the present embodiments are not to limit the spirit of the present embodiment, but are to describe the spirit of the present embodiment. The technical idea of the present embodiment is not limited to these embodiments. The scope of the present embodiment should be interpreted by the following claims, and it should be interpreted that all the spirits equivalent to the following claims fall within the scope of the present embodiment.

DESCRIPTION OF REFERENCE NUMERALS

10, 20: razor cartridge, 100: blade housing, 102: housing top surface, 104: housing bottom surface, 105: central opening, 110: second lubricating band, 120: guard, 130: razor blade, 140: clip, 150: side opening, 160: first lubricating band, 170: first central support unit, 175: coupling protrusion, 180: guide protrusion, 190: first accommodation portion, 200: frame, 202: frame top surface, 204: frame bottom surface, 210: third lubricating band, 220: outer portion, 225: longitudinal side portion, 240: connecting portion, 250: elastic force support portion, 270: second central support unit, 275: coupling groove, 280: guide groove, 290: second accommodation portion, 300: torsion spring, 305: spring groove, 500: first leaf spring, 502: head portion, 504: body portion, 700: second leaf spring, 900: first elastic portion, 950: bending area support unit, 1100: second elastic portion, 1300: third elastic portion, 1305: elastic portion separation preventing unit, 1350: elastic portion accommodation unit, 1500: gap, ax1: first pivot axis, ax2: second pivot axis

CROSS-REFERENCE TO RELATED APPLICATION

This patent application claims priority to Patent Application No. 10-2023-0168895, filed in Korea on Nov. 29, 2023, which is incorporated herein by reference in its entirety.

The invention claimed is:

1. A razor cartridge, comprising:

a blade housing for accommodating at least one razor blade having a cutting edge in a longitudinal direction, the blade housing comprising a housing top surface toward which the cutting edge faces and a housing bottom surface opposite to the housing top surface; and a frame coupled to the blade housing and configured to enable the blade housing to pivot with respect to the frame about a first pivot axis penetrating the blade housing, wherein the first pivot axis penetrates the blade housing in a direction parallel to a direction from the housing top surface to the housing bottom surface.

2. The razor cartridge of claim 1, further comprising a restoring force providing unit configured to provide a restoring force, configured to return the blade housing to a first rest position in a state where the blade housing is pivoted about the first pivot axis from the first rest position, to the blade housing.

3. The razor cartridge of claim 1, further comprising a guard disposed in front of the at least one razor blade with respect to a shaving direction, wherein the first pivot axis is positioned at the rear of the guard.

4. The razor cartridge of claim 1, wherein the first pivot axis is configured to penetrate a central region of the blade housing in the longitudinal direction.

5. The razor cartridge of claim 1, wherein the frame comprises:

a frame top surface adjacent to the housing top surface;

a frame bottom surface opposite to the frame top surface; and a connecting portion configured to be connected to a razor handle or a connector coupled with one side of the razor handle and configured to be disposed on the frame bottom surface.

6. The razor cartridge of claim 1, wherein the frame is configured to pivot with respect to a razor handle about a second pivot axis parallel to the longitudinal direction by being connected to the razor handle or a connector coupled with one side of the razor handle.

7. The razor cartridge of claim 6, wherein the frame comprises:

a frame top surface adjacent to the housing top surface;

a frame bottom surface opposite to the frame top surface; and an elastic force support portion formed on the frame bottom surface to be disposed in front of the first pivot axis in the shaving direction, and wherein the elastic force support portion is configured to receive a restoring force to return the frame to a second rest position in a state where the frame is pivoted about the second pivot axis from the second rest position.

8. The razor cartridge of claim 7, wherein:

the frame further comprises a second central support unit configured to have one surface coupled to the blade housing; and the elastic force support portion is positioned on the other surface opposite to the one surface of the second central support unit.

9. The razor cartridge of claim 1, wherein:

one of the blade housing and the frame comprises a coupling protrusion formed to protrude from at least one surface in a direction parallel to the first pivot axis;

the other one of the blade housing and the frame comprises a coupling groove formed by at least a portion thereof being depressed into a shape corresponding to the coupling protrusion; and the coupling protrusion is coupled to the coupling groove to form the first pivot axis.

10. The razor cartridge of claim 1, wherein the blade housing and the frame are coupled to each other in a direction parallel to the direction from the housing top surface to the housing bottom surface.

11. The razor cartridge of claim 2, wherein the restoring force providing unit comprises a leaf spring, at least a portion of which is fixed in position to the blade housing or the frame, and at least another portion of which is configured to be deformed due to the pivoting of the blade housing and the frame with respect to each other.

12. The razor cartridge of claim 2, wherein the restoring force providing unit is an elastic portion configured to have one side fixed to the blade housing or the frame and the other side forming a free end and configured to be deformed at least in part due to the pivoting of the blade housing and the frame with respect to each other.

13. The razor cartridge of claim 1, wherein at least a portion of the housing top surface and at least a portion of the frame adjacent to the housing top surface form a skin contact surface that contacts the skin of a user during shaving.

14. The razor cartridge of claim 1, wherein the blade housing comprises:

a guard disposed in front of the at least one razor blade with respect to a shaving direction; and a second lubrication band disposed in front of the guard with respect to the shaving direction.

15. The razor cartridge of claim 1, wherein the frame comprises at least one outer portion having a height extending in a direction parallel to the first pivot axis and configured to surround at least a portion of an outer portion of the blade housing in a state where the blade housing and the frame are coupled.

16. The razor cartridge of claim 15, wherein the at least one outer portion comprises at least one third lubrication band formed on an upper surface with respect to a height direction.

17. The razor cartridge of claim 15, wherein the at least one outer portion comprises a pair of longitudinal side portions disposed to be spaced apart from each other in the longitudinal direction to surround at least a portion of both longitudinal sides of the blade housing.

18. The razor cartridge of claim 15, wherein:

the blade housing comprises a guide protrusion that protrudes from at least a portion of an outer side surface;

the at least one outer portion comprises a guide groove formed by recessing at least a portion of an inner side surface of the blade housing along a pivot direction with respect to the frame; and the guide protrusion is configured to move along the guide groove.

19. The razor cartridge of claim 18, wherein:

the at least one outer portion comprises a stopper protruding from the inner side surface of the guide groove; and the stopper is configured to limit the pivoting of the blade housing with respect to the frame.

* * * * *